United States Patent
Menovcik et al.

(10) Patent No.: US 6,780,909 B2
(45) Date of Patent: Aug. 24, 2004

(54) COATING COMPOSITION HAVING LOW VOLATILE ORGANIC CONTENT

(75) Inventors: Gregory G. Menovcik, Farmington Hills, MI (US); Michele L. Stauffer, Ann Arbor, MI (US); Mark West, Mount Morris, MI (US); Sergio E. Balatan, West Bloomfield, MI (US); James A. Laugal, White Lake, MI (US)

(73) Assignee: BASF Corporation, Southfield, MI (US)

( * ) Notice: Subject to any disclaimer, the term of this patent is extended or adjusted under 35 U.S.C. 154(b) by 452 days.

(21) Appl. No.: 09/829,829

(22) Filed: Apr. 10, 2001

(65) Prior Publication Data

US 2002/0193509 A1 Dec. 19, 2002

(51) Int. Cl.⁷ .............................. C08K 3/02; C08K 5/01; C08K 5/02; C08K 5/04; C08K 5/07
(52) U.S. Cl. ..................... 524/364; 524/356; 524/361
(58) Field of Search ................................. 524/356, 361, 524/364, 801, 804

(56) References Cited

U.S. PATENT DOCUMENTS

| | | | |
|---|---|---|---|
| 6,160,058 A | * | 12/2000 | Ohrbom et al. ............. 525/481 |
| 6,342,558 B1 | * | 1/2002 | Grandhee ................... 524/457 |
| 2001/0036999 A1 | * | 11/2001 | Yokoyama et al. ......... 525/165 |
| 2003/0114590 A1 | * | 6/2003 | Ohrborn et al. ............ 525/157 |

FOREIGN PATENT DOCUMENTS

| CA | 2054550 | 10/1991 | ............ C09D/5/02 |
|---|---|---|---|
| WO | WO 94/10212 | 5/1994 | ............ C08F/8/30 |
| WO | WO 97/35937 | 10/1997 | ......... C09D/119/00 |
| WO | WO 98/53796 | 12/1998 | ............ A61K/7/48 |

* cited by examiner

*Primary Examiner*—James J. Seidleck
*Assistant Examiner*—U. K. Rajguru

(57) ABSTRACT

The coating composition of the invention includes a polymer, especially an acrylic polymer, having hydroxyl and/or primary carbamate functionality; a water-miscible organic solvent; a low hydrogen bonding oxygenated solvent; and water that is emulsified in the organic phase. The coating composition of the invention may be a clearcoat coating composition, preferably an automotive clearcoat coating composition. The invention further provides an article, such as an automotive vehicle, having a surface coated with a coating derived from the coating composition of the invention, particularly a composite coating having a basecoat layer and a clearcoat layer, and a method of producing such a coating on a substrate, particularly as a basecoat/clearcoat composite coating, with the coating composition of the invention preferably being at least the clearcoat of the composite coating. The coating composition of the invention provides especially low volatile organic content, with significant reductions of 25% or more from comparable previous coating compositions.

23 Claims, No Drawings

COATING COMPOSITION HAVING LOW VOLATILE ORGANIC CONTENT

FIELD OF THE INVENTION

The present invention relates to high solids coating compositions, particularly automotive topcoat coating compositions.

BACKGROUND OF THE INVENTION

Curable, or thermosettable, coating compositions are widely used in the coatings art, particularly for topcoats in the automotive and industrial coatings industry. Basecoat-clearcoat composite coatings are particularly useful as topcoats for which exceptional gloss, depth of color, distinctness of image, or special metallic effects are desired. The automotive industry has made extensive use of these coatings for automotive body panels.

Aqueous coating compositions and powder coating compositions have been increasingly used to meet legal restrictions on organic solvent emissions. Each of these technologies, however, has its drawbacks. Waterborne coatings include either resins with a high concentration of saltable or polyether groups or include surfactants, either of which make the coating water-sensitive. Waterborne coatings tend to have viscosity instability, with accompanying degradation of metallic appearance. Further, waterborne coatings require expensive, special application equipment, all stainless steel, and humidity controlled conditions. Powder coatings also require special applications and handling equipment. Powder coatings are also relatively expensive to manufacture and must be made with high glass transition temperature resins to avoid sintering on storage. Due to these special considerations, powder coatings technologies require high temperature curing, which again adds to their expense. Moreover, there is a concern of regulated emissions of particulates below a certain particle size.

The content of volatile organic compounds has also been reduced by using resins of lower viscosity, for example very low molecular weight polymeric or oligomeric materials or reactive diluent compounds. The physical requirements of the cured film, such as hardness and durability, remain the same, however, and it becomes more difficult to achieve those properties as the molecular weight is reduced further and further. Consequently, there is a practical limit to how low the molecular weight of the vehicle components can be. On the other hand, the high solids can be achieved by formulating the coating composition at a higher viscosity. High viscosity coating compositions, however, require special equipment to handle and apply them, such as bigger diameter pipes and bigger pumps in the recirculation system or heated pipes to lower the viscosity. These modifications are expensive and require down time of the plant paint shop.

Thus, there remains a need for coating compositions that have low volatile organic content and can be applied using existing equipment in plants that are configured to handle more traditional coatings technology. Such a coating composition still must provide a cured coating having the desired physical properties.

SUMMARY OF THE INVENTION

The coating composition of the invention includes an organic phase including a polymer, especially an acrylic polymer, having hydroxyl and/or primary carbamate functionality; a water-miscible organic solvent; a low hydrogen bonding oxygenated solvent; and water that is emulsified in the organic phase. The polymer is not dissolved or dispersed in water, but rather remains in a continuous, organic phase. Because the acrylic resin does not contain a high concentration of salted groups, it avoids the problems of emissions of a salting base and water sensitivity from a high concentration of acid groups.

The term "primary carbamate group" as used in connection with the present invention refers to a group having a structure:

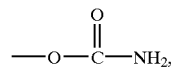

The term "water-miscible organic solvent" as used in connection with the present invention refers to an organic compound that is liquid at room temperature and that is completely soluble in water.

The "low hydrogen bonding oxygenated solvent" of the invention is an organic compound that is liquid at room temperature and that contains at least one oxygen atom and has as a Hanson solubility parameter a hydrogen bonding value up to about 6.0.

In a particularly advantageous embodiment, the coating composition of the invention is a clearcoat coating composition, preferably an automotive clearcoat coating composition. The invention further provides an article, such as an automotive vehicle, having a surface coated with a coating derived from the coating composition of the invention, particularly a composite coating having a basecoat layer and a clearcoat layer, and a method of producing such a coating on a substrate, particularly as a basecoat/clearcoat composite coating, with the coating composition of the invention preferably being at least the clearcoat of the composite coating.

The coating composition of the invention provides especially low volatile organic content, with significant reductions of 25% or more from comparable previous coating compositions. The lower VOC of the present water-containing composition is further enhanced by the water being preferentially evaporated during spraying and in the flash tunnel, while the coating tends to retain the organic solvent until the curing oven bake. This behavior is especially significant for minimizing regulated emissions of the paint shop, as the emissions from the oven can be thermally oxidized. In particular, the present coating composition unexpectedly also provides excellent leveling, which can be quantified by wave scan or Autospec™ of the coating. Finally, the emulsified water helps to reduce the odor and increase the flashpoint of the coating composition.

DETAILED DESCRIPTION OF THE INVENTION

The coating composition includes, in an organic phase, a polymer, preferably an acrylic polymer, having functionality selected from hydroxyl groups, primary carbamate groups, and combinations of these; a water-miscible organic solvent; an oxygenated solvent that is not strongly hydrogen bonding; and water. The water is emulsified in the coating. The coating thus has a solventborne continuous phase.

The polymer includes hydroxyl groups, primary carbamate groups, or both hydroxyl groups and primary carbamate groups. Suitable polymers for the coating composition include, without limitation, acrylic polymers, polyurethane polymers, and polyester polymers. Preferred among these are acrylic polymers.

Synthesis of such polymers for coatings are well-known in the art. A typical synthesis of the preferred acrylic polymer will be described, but the person skilled in the art should understand that the principles apply likewise to other suitable coatings resins.

With particular reference to the preferred acrylic polymer, then, the hydroxyl and/or carbamate functionality may be conveniently introduced by polymerizing a monomer having an hydroxyl group and/or polymerizing a monomer having a primary carbamate group, although it is also possible to polymerize with a monomer having functionality that may be reacted to supply an hydroxyl and/or carbamate group after polymerization. Examples of addition polymerizable monomers having hydroxyl or primary carbamate functionality include, without limitation, hydroxyethyl acrylate, hydroxyethyl methacrylate, hydroxypropyl acrylate, hydroxypropyl methacrylate, hydroxybutyl acrylate, and hydroxybutyl methacrylate; polyalkylene glycol acrylates and methacrylates; and the reaction product of a glycidyl-group containing monomer, such as glycidyl acrylate, glycidyl methacrylate, and allyl glycidyl ether, with a carboxylic acid. Hydroxyl and/or primary carbamate functionality can be introduced to an acrylic polymer by a number of reactions, including, without limitation, reacting glycidyl functionality with a carboxylic acid; reacting a carboxylic acid group with a glycidyl compound; and by other methods, such as those set out in Ohrbom et al, U.S. Pat. No. 6,160,058 and McGee et al., U.S. Pat. No. 5,726,244, both of which are incorporated herein by reference.

The acrylic polymer of the organic phase includes a sufficient amount of the hydroxyl and/or carbamate functionality so that the acrylic polymer, in conjunction with the water miscible solvent(s) and the oxygenated solvent that has hydrogen bonding, stabilizes the emulsion of the water. In one preferred embodiment, the acrylic polymer has an equivalent weight (with respect to the hydroxyl and/or carbamate functionality) of up to about 650 grams/equivalent, more preferably up to about 520 grams/equivalent, still more preferably up to about 435 grams/equivalent, even , more preferably up to about 370 grams/equivalent, and most preferably up to about 350 grams/equivalent. The acrylic polymer preferably has an equivalent weight (with respect to the hydroxyl and/or carbamate functionality) of at least about 260 grams/equivalent, more preferably at least about 290 grams/equivalent, and still more preferably at least about 310 grams/equivalent. The acrylic polymer preferably has equivalent weight in the range of 260 to 650 grams/equivalent, more preferably 290 to 520 grams/equivalent, still more preferably 290 to 435 grams/equivalent, even more preferably 290 to 370 grams/equivalent, and most preferably 310 to 350 grams/equivalent. In another preferred embodiment, the hydroxyl functionality is partially or completely replaced with carbamate functionality, for example through transcarbamation.

The acrylic polymer may be polymerized using one or more comonomers. Examples of such comonomers include, without limitation, α,β-ethylenically unsaturated monocarboxylic acids containing 3 to 5 carbon atoms such as acrylic, methacrylic, and crotonic acids and the esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The comonomers may be used in any combination.

The acrylic polymer may have a small amount of acid functionality. It is not preferred for the acid group to be salted, as it is believed that salted groups would interfere with the desired emulsification of the water in the organic solvent-acrylic polymer system, because the polymer must remain in the organic continuous phase. If an acid monomer is included as a comonomer, it typically may be up to about 5% by weight of the monomers being polymerized, preferably up to about 1% by weight of the monomers being polymerized.

The acrylic polymer may be prepared using conventional techniques, such as by heating the monomers in the presence of a polymerization initiating agent and optionally chain transfer agents. The polymerization is preferably carried out in solution, although it is also possible to polymerize the acrylic polymer in bulk. It is particularly preferred to employ one or both of the water-miscible organic solvent and the low hydrogen bonding oxygenated solvent as part or all of the polymerization solvent. Suitable polymerization solvents include, without limitation, ethyl acetate, acetone, methyl ethyl ketone, methyl propyl ketone, ethylene glycol monoalkyl ethers and propylene glycol monoalkyl ethers, including propylene glycol monomethyl ether, propylene glycol monoethyl ether, ethylene glycol monopropyl ether, and propylene glycol monopropyl ether, monoalkyl ethers of dipropylene glycol such as the monomethyl ether of dipropylene glycol, and alcohols such as methanol, ethanol n-propanol, isopropanol, and tert-butyl alcohol.

Typical initiators are organic peroxides such as dialkyl peroxides such as di-t-butyl peroxide, peroxyesters such as t-butyl perooctoate and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol, and dimeric alpha-methyl styrene.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes, more preferably no more than about five minutes.

The acrylic polymer should have a weight average molecular weight of at least about 2400, preferably at least about 3000, more preferably at least about 3500, and particularly preferably at least about 4000. Weight average molecular weight may be determined by gel permeation chromatography using polystyrene standard. In addition, the weight average molecular weight is preferably up to about 5000, more preferably up to about 4750, and still more preferably up to about 4500, The solvent or solvent mixture is generally heated to the reaction temperature and the monomers and initiator(s) and optionally chain transfer agent(s) are added at a controlled rate over a period of time, typically from about two to about six hours. Additional solvent may be added concurrently. The mixture is usually held at the reaction temperature after the additions are completed for a period of time to complete the polymerization. Optionally, additional initiator may be added to ensure complete conversion of monomers to polymer.

Although the specific details and optimum equivalent weight and weight average molecular weights may be different for other polymers from those just described for an acrylic polymer, the polymers should have low equivalent weight and a weight average molecular weight that produces a similar viscosity. Polyurethane polymers are prepared by reaction of a compounds or macromonomers having two hydroxyl groups, for example compounds such as 1,4-butanediol, a di-beta-hydroxy carbamate compound, and neopentyl glycol and macromonomers such as polyester diols, with a diisocyanate materials. When the coating composition is a topcoat (including basecoat and clearcoat) composition, the diisocyanate is aliphatic, for example isophorone diisocyanate, hexamethylene diisocyanate or cyclohexamethylene diisocyanate. In a preferred embodiment, the polyurethane is prepared in two stages, with an isocyanate-functional prepolymer prepared in the first stage and capped with a polyhydroxyl compound, such a trimethylolpropane, pentaerythritol, diethanolamine, and so on. Polyester polymers are prepared by reaction of dihydroxy compounds, such as those already mentioned, and dicarboxylic acids. A monomer having carbamate functionality in addition to the hydroxyl functionality may be reacted, in which case carbamate functionality is introduced along the backbone of the polymer. Hydroxy end groups may be converted to carbamate functionality by any of the methods mentioned in conjunction with the acrylic polymer. See also Ohrbom et al., U.S. Pat. No. 6,084,038 and the references cited therein; Menovcik et al. U.S. Pat. No. 5,532,061; Menovcik et al., U.S. Pat. No. 5,508,379; and Menovcik et al., U.S. Pat. No. 5,451,656, the disclosures of which are incorporated herein by reference.

The coating composition preferably contains one or more crosslinking agents that react with the acrylic polymer after the coating composition is applied to form a cured coating. The crosslinking agents have two or more groups reactive with the polymer, and the crosslinker advantageously have affinity for water. That is, the crosslinking agents preferably have a polar group or groups. A certain amount of crosslinking agents without affinity for water may also be included.

The crosslinker may be monomeric, oligomeric, or polymeric. Examples of suitable crosslinking agents include, without limitation, aminoplast crosslinkers and polyisocyanates, especially blocked aliphatic polyisocyanates, particularly those blocked with polar blocking groups. Suitable blocking agents are those compounds that will unblock under the curing conditions to regenerate the isocyanate group for reaction as a crosslinking site. Blocking agents suitable for crosslinkers are known in the art and include, without limitation, oximes, lower alcohols, lactams, and phenol. Specific examples of such materials include, without limitation, methyl ethyl ketoxime, acetaldehyde oxime, ε-caprolactam, and pyrazole compounds such as 2,5-dimethyl pyrazole.

The aminoplast crosslinker is advantageously a monomeric, preferably partially alkylated, particularly preferably partially methylated, melamine formaldehyde resin. Melamine formaldehyde resins having imino content are also useful.

The coating composition may include a resinous material, for example one or more of the carbamate-functional materials described in Ohrbom et al., U.S. Pat. No. 6,165,618, Green et al., U.S. Pat. No. 5,872,195, McGee et al., U.S. Pat. No. 5,854,385, Green et al., U.S. Pat. No. 5,852,136, Ohrbom et al., U.S. Pat. No. 5,827,930, Menovcik et al., U.S. Pat. No. 5,792,810, McGee et al., U.S. Pat. No. 5,770,650, Ohrbom et al., U.S. Pat. No. 5,766,769, Bammel et al., U.S. Pat. No. 5,760,127, Menovcik et al., U.S. Pat. No. 5,744,550, Rehfuss et al., U.S. Pat. No. 5,719,237, Green, U.S. Pat. No. 5,693,724, Green, U.S. Pat. No. 5,693,723, Menovcik, U.S. Pat. No. 5,659,003, Briggs, U.S. Pat. No. 5,639,828, Rehfuss et al., U.S. Pat. No. 5,336,566, Ohrbom et al., U.S. patent application Ser. No. 09/741,511, filed Dec. 19, 2000, and Ohrbom et al., U.S. patent application Ser. No. 09/464,309, filed Dec. 15,1999, each of which is incorporated herein by reference. The carbamate-functional material can be a compound or an oligomer (that is, with up to ten or so repeating monomer units). Preferably the carbamate-functional material has a molecular weight (for a compound), or number average molecular weight (for an oligomer) of up to about 2000, preferably up to about 1800. Water soluble carbamate-functional materials are preferably avoided, as they might interfere with emulsification of the water in the organic phase.

The coating composition includes a water-miscible organic solvent and a low hydrogen bonding oxygenated solvent. Standard references, such as the CRC Handbook, may be consulted to determine whether a particular solvent is water-miscible. Suitable examples of water-miscible solvents include, without limitation, acetone, diacetone alcohol, ethylene glycol monomethyl, monoethyl, monopropyl, and monobutyl ethers (including all of the propyl and butyl isomers), the acetate of the monomethyl ether of ethylene glycol, diethylene glycol monomethyl, monoethyl, monopropyl, and monobutyl ethers, triethylene glycol monomethyl, monoethyl, monopropyl, and monobutyl ethers, propylene glycol monomethyl, monoethyl, and monopropyl ethers (including the n-propyl and isopropyl ethers), dipropylene glycol monomethyl and monoethyl ethers, tripropylene glycol monomethyl and monoethyl ethers, butyl ethoxy propylene glycol, methanol, ethanol, n-propanol, isopropanol, and 1-methyl-2-pyrrolidinone. Low hydrogen bonding oxygenated solvents include water-immiscible alcohols, ester solvents, and acetate solvents. The low hydrogen bonding oxygenated solvent should have a Hanson solubility parameter for hydrogen bonding of no more than about 6.0. Particular examples of low hydrogen bonding oxygenated solvents include, without limitation, ketones such as methyl ethyl ketone, methyl propyl ketone, diethylene ketone, cyclohexanone, methyl butyl ketone, methyl isobutyl ketone, methyl n-amyl ketone, and methyl isoamyl ketone; non-water miscible alcohols such as hexanol and 2-ethylhexanol; esters such as ethoxy ethyl propionate, ethyl acetate, n-propyl acetate, isopropyl acetate, n-butyl acetate, isobutyl acetate, sec-butyl acetate, tert-butyl acetate, ethyl propionate, n-propyl propionate, isopropyl propionate, n-butyl propionate, isobutyl propionate, sec-butyl propionate, tert-butyl propionate, and ethylene glycol monoalkyl ether acetates (other than ethylene glycol monomethyl ether acetate) and propionates, and monobutyl ether of diethylene glycol.

A minor amount of non-oxygenated, non-water miscible solvents may also be included in the coating composition, so long as those solvents do not interfere with the interaction between the water, the polymer, and the water miscible solvent. Preferably, no more than about 10%, more preferably no more than about 5%, by weight of the total solvent weight is non-oxygenated, non-water miscible solvent.

The coating composition further includes water. The water is absorbed into the coating composition as an emulsion. It is desirable for the water to form a colloidal emulsion. Unexpectedly, the water reduces the viscosity of the solvent-borne coating composition. The water emulsion also provides a surprising improvement in the leveling of the coating formed from the coating composition.

For a given polymer, the amounts of water-miscible organic solvent, low hydrogen bonding oxygenated solvent, and water are selected so that the water is emulsified in the organic phase. Preferably, the water forms a colloidal emulsion (that is, an emulsion of very small droplet size). For a given amount of water-miscible organic solvent and a given amount of low hydrogen bonding oxygenated organic solvent, an optimum amount of water can be determined in a straightforward manner by adding water incrementally and measuring the viscosity of the resulting coating composition to determine at what point the viscosity exceed the desired coating composition viscosity with additional water. The viscosity of the coating compositions initially decreases with added water, goes through a minimum viscosity, and then begins to increase. The water may continue to be added until the desired viscosity would be exceeded if any more water were added.

In general, the water can be up to about 50% by weight, based on the total amount of volatile materials (i.e., water plus organic solvents). In a preferred embodiment, the water is at least about 10%, more preferably at least about 15%, still more preferably at least about 20%, and even more preferably at least about 25% by weight of the total amount of volatile material.

In general, the water-miscible organic solvent can be up to about 50% by weight, based on the total amount of volatile materials (i.e., water plus organic solvents). In a preferred embodiment, the water-miscible organic solvent is at least about 10%, more preferably at least about 15%, still more preferably at least about 20%, and even more preferably at least about 25% by weight of the total amount of volatile material.

In general, the low hydrogen bonding oxygenated solvent can be up to about 50% by weight, based on the total amount of volatile materials (i.e., water plus organic solvents). In a preferred embodiment, the low hydrogen bonding oxygenated solvent is at least about 10%, more preferably at least about 15%, still more preferably at least about 20%, and even more preferably at least about 25% by weight of the total amount of volatile material.

The organic phase of the coating composition includes the polymer having a sufficient amount of the hydroxyl functionality and/or primary carbamate functionality and a sufficient amount of the water-miscible organic solvent to form a colloidal emulsion of the water. The organic phase further includes a low hydrogen bonding oxygenated solvent, which advantageously reduces the viscosity of the coating composition.

The weight ratio of water-miscible organic solvent, low hydrogen bonding oxygenated solvent, and water in the coating composition is preferably from about 0.4 to about 3.0 parts by weight water-miscible organic solvent to from about 0.4 to about 3.0 parts by weight low hydrogen bonding oxygenated solvent for each part by weight of water; more preferably from about 0.5 to about 2.5 parts by weight water-miscible organic solvent to from about 0.5 to about 2.5 parts by weight low hydrogen bonding oxygenated solvent for each part by weight of water; and even more preferably from about 0.75 to about 2.0 parts by weight water-miscible organic solvent to from about 0.75 to about 2.0 parts by weight low hydrogen bonding oxygenated solvent for each part by weight of water.

The volatile organic content of the coating composition, as measured according to EPA Method 24, is preferably about 3.5 lbs./gal. or less, more preferably about 3.2 lbs./gal. or less, and even more preferably about 3.0 lbs./gal. or less (without water). (VOC values used herein are those calculated without water.) The VOC is minimized as much as possible by using the minimum amount of organic solvent along with the maximum amount of water to obtain the desired viscosity.

In relation to the polymer, more water may be emulsified with increasing amounts of hydroxyl and/or primary carbamate groups on the polymer (i.e., with decreasing equivalent weight), with the caveat that the polymer must remain in the continuous organic phase.

In a preferred embodiment, the coating composition has a viscosity is 200 centipoise or less. Coating compositions at this viscosity can be applied using the same application equipment as is used with traditional high solids coating technology. Accordingly, the monomers used to prepare the acrylic or other polymer are selected and apportioned to achieve the desired viscosity, and in conjunction therewith the molecular weight of the polymer and the water miscible solvent or solvent blend are likewise selected to achieve the desired viscosity.

In a preferred embodiment, the coating composition of the invention is a coating composition for an automotive vehicle. Among the kinds of automotive coating compositions are primers and primer surfacers, topcoats, basecoats, and clearcoats. Clearcoats are particularly preferred.

Primer and primer surfacer compositions may further include one or more pigments and typically include one or more fillers. Basecoat and one layer topcoat compositions further include one or more color pigments and/or one or more special effect pigments, including metallic flake pigments and pearlescent pigments. Clearcoat compositions may be tinted.

The coating composition may experience some stratification over a period of time, but the composition is easily re-homogenized with gentle stirring.

The invention is further described in the following examples. The examples are merely illustrative and do not in any way limit the scope of the invention as described and claimed.

EXAMPLES

The following table shows the compositions of clearcoat coating compositions of Comparative Example A that contains no emulsified water and Examples 1–3 of the invention.

| Clearcoat Composition | Total Wt % Components | | | |
|---|---|---|---|---|
| | Comparative Example A | Example 1 | Example 2 | Example 3 |
| Resin A | 49.04 | | | |
| Resin B | | 49.95 | | |
| Resin C | | | 45.14 | |
| Resin D | | | | 49.71 |
| Resin E | | 5.32 | 4.83 | 5.32 |
| Melamine #1 | 8.72 | 9.26 | 8.41 | 9.26 |
| Melamine #2 | 0.53 | | | |
| Blocked Isocyanate (DMP blocked HDI) "A" | 9.95 | | 9.59 | |
| Blocked Isocyanate (DMP blocked HDI) "B" | | 10.56 | | 10.55 |
| Additive Package | 11.94 | 9.73 | 2.66 | 4.40 |
| Free Solvent Additions | 19.82 | 15.19 | 29.38 | 20.77 |

| | Final Solvent Composition, % by weight total solvent | |
|---|---|---|
| Propyl Propasol | | 30.3 |
| Water | 0.0 | 25.5 |
| methyl propyl ketone (2-pentanone | | 19.7 |
| methyl amyl ketone | | 5.8 |
| isobutanol | 6.4 | 4.9 |
| amyl acetate (primary-mixed iso | 2.2 | 4.7 |
| Solvesso 100 | 42.8 | 2.7 |
| methyl 2-hexanone (MIAK) | | 2.6 |
| Acetate, Arcosolv PM, PMA | 1.9 | 1.4 |
| methyl ethyl ketone (2-butanone | | 1.2 |
| xylene (mixed isomers | 4.5 | 0.6 |
| isopropanol 99% | 0.2 | 0.3 |
| naptha aliphatic (mineral spirits) | 0.1 | 0.1 |
| n-butanol | 10.7 | 0.0 |
| n-butyl acetate | 0.1 | |
| Exxate 600 (oxohexyl acetate) | 28.0 | |
| mineral spirits | 3.0 | 0.2 |

Resin A is an acrylic polymer polymerized from a monomer mixture containing 39% by weight hydroxyethyl methacrylate. Resin A is about 66% nonvolatile in aromatic solvent. Resin A has a viscosity of about 18,500 cps and a weight average molecular weight of 4600 daltons.

Resin B is an acrylic polymer polymerized from a monomer mixture containing 39% by weight hydroxyethyl methacrylate. Resin B is about 66% nonvolatile in a combination of propylene glycol monopropyl ether and methyl propyl ketone. Resin B has a viscosity of about 500 cps and a weight average molecular weight of 3500 daltons.

Resin C is an acrylic polymer polymerized from a monomer mixture containing 39% by weight hydroxyethyl methacrylate. Resin C is about 66% nonvolatile in propylene glycol monopropyl ether. Resin C has a viscosity of about 4500 cps and a weight average molecular weight of about 5000 daltons.

Resin D is an acrylic polymer polymerized from a monomer mixture containing 39% by weight hydroxyethyl methacrylate. Resin D is about 66% nonvolatile in methyl propyl ketone. Resin D has a viscosity of about 600 cps and a weight average molecular weight of 3800 daltons.

Resin E is a carbamate functional resin prepared according to Rehfuss, U.S. Pat. No. 5,336,566, having a nonvolatile content of 30.8% by weight and containing 25.3% by weight amyl acetate, 22.5% by weight isomers of butanol, and 21.4% by weight methyl isoamyl ketone.

Melamine #1 is a methylated melamine. Melamine #2 is a butylated melamine.

Blocked Isocyanate "A" is 2,5-dimethyl pyrazole blocked hexamethylene diisocyante, 75% in a blend of aromatic solvent and propylene glycol monomethyl ether acetate. Blocked Isocyanate "B" is 2,5-dimethyl pyrazole blocked hexamethylene diisocyanate, 80% in methyl ethyl ketone.

In the total solvent composition breakdown given for Comparative Example A and Example 1, propyl propasol and isopropanol are water miscible solvents; MPK, MAK, amyl acetate, PM acetate, MEK, butyl acetate and Exxate 600 are oxygenated solvents having a Hanson solubility parameter hydrogen bonding value of up to about 6.0

| Solvent Classification | Total % Solvent | | | |
|---|---|---|---|---|
| | Comparative Example A | Example 1 | Example 2 | Example 3 |
| Water Miscible | 0.2 | 30.6 | 44.2 | 12.1 |
| oxygenated solvents having a Hanson solubility parameter hydrogen bonding value of up to about 6.0 | 32.1 | 35.4 | 20.1 | 50.1 |
| Water | 0.0 | 25.5 | 28.5 | 24.4 |
| Other | 67.7 | 8.5 | 7.2 | 13.3 |
| Solvent Classification Ratios | Comparative Example A | Example 1 | Example 2 | Example 3 |
| Water Miscible | 8.4 | 1.2 | 1.6 | 0.5 |
| oxygenated solvents having a Hanson solubility parameter hydrogen bonding value of up to about 6.0 t | 1258.5 | 1.4 | 0.7 | 2.1 |
| Water | 1.0 | 1.0 | 1.0 | 1.0 |
| Other | 2652.0 | 0.3 | 0.3 | 0.5 |
| Final Clearcoat Properties | Comparative Example A | Example 1 | Example 2 | Example 3 |
| VOC + water | 3.95 | 2.72 | 3.12 | 2.88 |
| VOC − water | 3.95 | 3.07 | 3.66 | 3.25 |
| Brookfield Visc (cps) | N/A | 171 | 197 | 229 |
| Ford #4 Viscosity (sec) | 33 | N/A | N/A | N/A |
| NV | 51.7 | 56.3 | 48.1 | 54.6 |

The invention has been described in detail with reference to preferred embodiments thereof. It should be understood, however, that variations and modifications can be made within the spirit and scope of the invention.

What is claimed is:

1. A coating composition, comprising
   (a) in an organic continuous phase, a polymer having functional groups selected from the group consisting of hydroxyl groups, primary carbamate groups, and combinations thereof;
   (b) a water-miscible organic solvent;
   (c) en oxygenated solvent having a Hanson solubility parameter hydrogen bonding value of up to about 6.0; and
   (d) water,
wherein the water is emulsified.

2. A coating composition according to claim 1, wherein the polymer is selected from the group consisting of acrylic polymers, polyester polymers, polyurethane polymers, and combinations thereof.

3. A coating composition according to claim 1, wherein the polymer has hydroxyl groups.

4. A coating composition according to claim 3, wherein the coating composition further includes one or more carbamate-functional materials.

5. A coating composition according to claim 1, wherein water is present in an amount of <50% based on total amount of (b), (c) and (d) and water is colloidally emulsified in the coating composition.

6. A coating composition, comprising
   (a) an acrylic polymer having an equivalent weight of up to about 650 grams per equivalent of hydroxyl functionality, primary carbamate functionality, or a combination of hydroxyl and primary carbamate functionality;
   (b) a water-miscible organic solvent;
   (c) an oxygenated solvent having a Hanson solubility parameter hydrogen bonding value of up to about 6.0; and
   (d) water,
wherein the water is emulsified.

7. A coating composition according to claim 6, wherein the acrylic polymer has an hydroxyl equivalent weight of up to about 650 grams per equivalent.

8. A coating composition according to claim 6, wherein the coating composition is a clearcoat composition.

9. A coating composition according to claim 6, wherein the acrylic polymer has an equivalent weight of up to about 520 grams per equivalent.

10. A coating composition according to claim 6, wherein the acrylic polymer has an equivalent weight of at least about 260 grams per equivalent.

11. A coating composition according to claim 6, wherein the acrylic polymer has an equivalent weight in the range from 290 to 520 grams per equivalent.

12. A coating composition according to claim 6, wherein the acrylic polymer has a primary carbamate equivalent weight of up to about 650 grams per equivalent.

13. A coating composition, comprising an organic phase comprising
   a polymer having a sufficient amount of functionality selected from the group consisting of hydroxyl functionality, primary carbamate functionality, and combinations thereof,
   water and
   a sufficient amount of a water-miscible organic solvent to form a colloidal emulsion of water in the organic phase, wherein the organic phase further includes an oxygenated solvent having a Hanson solubility parameter hydrogen bonding value of up to about 6.0.

14. A coating composition according to claim 13, wherein the polymer is in acrylic polymer.

15. A coating composition according to claim 14, wherein the acrylic polymer has a weight average molecular weight in the range from about 2400 to about 5000.

16. A coating composition according to claim 14, wherein the acrylic polymer has an equivalent weight in the range of 260 to 650 grams/equivalent.

17. A coating composition according to claim 13, wherein the water-miscible organic solvent is selected from the group consisting of acetone, diacetone alcohol, ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, propylene glycol monomethyl ether, propylene glycol monoethyl ether, propylene glycol monopropyl ether, dipropylene glycol monomethyl ether, dipropylene glycol monoethyl ether, tripropylene glycol monomethyl ether, tripropylene glycol monoethyl ether, butyl ethoxy propylene glycol, methanol, ethanol, n-propanol, isopropanol, 1-methyl-2-pyrrolidinone, and combinations thereof.

18. A coating composition according to claim 13, wherein the water-miscible organic solvent is at least about 10% by weight of the combined weights of water-miscible organic solvent, low hydrogen bonding oxygenated solvent, other organic solvent, and water in the coating composition.

19. A coating composition according to claim 13, wherein the low hydrogen bonding oxygenated solvent is selected from the group consisting of water-immiscible alcohol solvents, ester solvents, ketone solvents, arid combinations thereof.

20. A coating composition according to claim 13, wherein the low hydrogen bonding oxygenated solvent is at least about 10% by weight of the combined weights of water-miscible organic solvent, low hydrogen bonding oxygenated solvent, other organic solvent, and water in the coating composition.

21. A coating composition according to claim 13, wherein the coating composition contains no more than about 25% by weight of organic solvent other than the water-miscible organic solvent and the low hydrogen bonding oxygenated solvent, based on the combined weights of water-miscible organic solvent, low hydrogen bonding oxygenated solvent, the other organic solvent, and water in the coating composition.

22. A coating composition according to claim 13, wherein the water is at least about 10% by weight of the combined weights of water-miscible organic solvent, low hydrogen bonding oxygenated solvent, other organic solvent, and water in the coating composition.

23. A coating composition according to claim 13, wherein weight ratio of water-miscible organic solvent, low hydrogen bonding oxygenated solvent, and water in the coating composition is from about 0.4 to about 3.0 parts by weight water-miscible organic solvent to from about 0.4 to about 3.0 parts by weight low hydrogen bonding oxygenated solvent for each part by weight of water.

* * * * *